United States Patent
Feher

(10) Patent No.: US 11,300,011 B1
(45) Date of Patent: Apr. 12, 2022

(54) GAS TURBINE HEAT RECOVERY SYSTEM AND METHOD

(71) Applicant: General Electric Company, Schenectady, NY (US)

(72) Inventor: Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/235,203

(22) Filed: Apr. 20, 2021

(51) Int. Cl.
| | |
|---|---|
| *F01K 23/10* | (2006.01) |
| *F01K 19/10* | (2006.01) |
| *F01K 13/02* | (2006.01) |
| *F01K 13/00* | (2006.01) |

(52) U.S. Cl.
CPC ............ *F01K 19/10* (2013.01); *F01K 13/003* (2013.01); *F01K 13/02* (2013.01); *F01K 23/10* (2013.01); *F05D 2220/72* (2013.01); *F05D 2260/213* (2013.01); *F05D 2260/232* (2013.01); *F05D 2260/606* (2013.01); *F05D 2270/303* (2013.01)

(58) Field of Classification Search
CPC ........ F01K 19/10; F01K 13/003; F01K 13/02; F01K 23/10; F05D 2220/72; F05D 2260/213; F05D 2260/232; F05D 2260/606; F05D 2270/303
See application file for complete search history.

(56) References Cited

U.S. PATENT DOCUMENTS

| | | | |
|---|---|---|---|
| 6,389,797 B1 * | 5/2002 | Sugishita | F01K 23/106 60/39.182 |
| 8,356,466 B2 | 1/2013 | Motakef et al. | |
| 8,468,830 B2 | 6/2013 | Motakef et al. | |
| 8,483,929 B2 | 7/2013 | DiAntonio et al. | |
| 2010/0083661 A1 * | 4/2010 | Narayanaswamy | F01K 13/02 60/670 |
| 2011/0185702 A1 * | 8/2011 | Bilton | F02C 9/26 60/39.182 |
| 2012/0037097 A1 | 2/2012 | Schroeder et al. | |
| 2013/0199196 A1 | 8/2013 | Chillar et al. | |
| 2013/0199202 A1 | 8/2013 | Zhang et al. | |
| 2014/0096535 A1 * | 4/2014 | Esakki | F01K 23/10 60/783 |
| 2017/0268384 A1 * | 9/2017 | Couzzicarneiro | H02K 7/1823 |

FOREIGN PATENT DOCUMENTS

| | | |
|---|---|---|
| EP | 2626535 A2 | 8/2013 |
| EP | 2881562 A1 | 6/2015 |

* cited by examiner

*Primary Examiner* — Shafiq Mian
(74) *Attorney, Agent, or Firm* — Dority & Manning, P.A.

(57) ABSTRACT

A gas turbine system includes a gas turbine and a water circuit. The water circuit includes a supply line fluidly coupling the low pressure economizer to a low pressure water supply. A connection line fluidly couples the low pressure evaporator to the low pressure economizer. A bypass supply line extends between the connection line and a heat exchanger. A bypass return line extends from the heat exchanger and includes a first return branch and a second return branch. The first return branch extends to the supply line. The second return branch extends to the connection line. At least one first diverter valve disposed on the bypass return line. The at least one first diverter valve operable to direct the flow of water towards one or both of the supply line and the connection line.

20 Claims, 6 Drawing Sheets

US 11,300,011 B1

GAS TURBINE HEAT RECOVERY SYSTEM AND METHOD

FIELD

The present disclosure relates generally to a gas turbine heat recovery system and method. In particular, the present disclosure relates to a gas turbine system including a water circuit that defines two flow circuits arranged in parallel.

BACKGROUND

A gas turbine power plant such as a combined cycle power plant (CCPP) generally includes a gas turbine having a compressor section, a combustor section, a turbine section, a heat recovery steam generator (HRSG) that is disposed downstream from the turbine and at least one steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Gas turbines often include one or more systems or components in need of heating during operation. Typically, this is accomplished by utilizing a portion of the water or steam from the HRSG in conjunction with a heat exchanger disposed on the system or component of the gas turbine in need of heating. However, known systems and methods for utilizing HRSG steam or water for heating gas turbine components often lowers the overall CCPP efficiency. Thus, an improved system and method for utilizing HRSG steam or water for heating one or more systems or components of a gas turbine is desired in the art.

BRIEF DESCRIPTION

Aspects and advantages of the gas turbine systems and methods in accordance with the present disclosure will be set forth in part in the following description, or may be obvious from the description, or may be learned through practice of the technology.

In accordance with one embodiment, a method for operating a gas turbine system is provided. The gas turbine system includes a gas turbine and a water circuit in thermal communication with the gas turbine. The gas turbine having an inlet section, a compressor section, a combustion section, a turbine section, and an exhaust section. The exhaust section configured to receive a flow of exhaust gases from the turbine section. The method includes a step of receiving, via a supply line, a flow of water to a low pressure economizer. The low pressure economizer disposed at least partially within an exhaust section of the gas turbine system. The method further includes a step of conveying, via a connection line, a first portion of the flow of water from the low pressure economizer to a low pressure evaporator. The low pressure evaporator is disposed at least partially within the exhaust section upstream of the low pressure economizer with respect to the flow of exhaust gases. The method further includes a step of conveying, via a bypass supply line, a second portion of the flow of water to a heat exchanger in thermal communication with one or more fluids of the gas turbine. The method further includes delivering, via a bypass return line, the second portion of the flow of water to a first diverter valve. The method further includes directing, via the first diverter valve, the second portion of the flow of water to one or both of a first a first return branch of the bypass return line and a second return branch of the bypass return line. The first return branch extends between the first diverter valve and the supply line. Second return branch extends between the first diverter valve and the connection line.

In accordance with another embodiment, a gas turbine system is provided. The gas turbine system includes a gas turbine having an inlet section, a compressor section, a combustion section, a turbine section, and an exhaust section. The exhaust section configured to receive a flow of exhaust gases from the turbine section. A low pressure economizer disposed at least partially within the exhaust section. A low pressure evaporator disposed at least partially within the exhaust section upstream of the low pressure economizer with respect to the flow of exhaust gases. A water circuit in thermal communication with the gas turbine at least partially via the low pressure economizer and the low pressure evaporator. The water circuit includes a supply line fluidly coupling the low pressure economizer to a low pressure water supply. The water circuit receives a flow of water from the low pressure water supply via the supply line. A connection line fluidly couples the low pressure evaporator to the low pressure economizer. A bypass supply line extends between the connection line and a heat exchanger. The heat exchanger is positioned in thermal communication with one or more fluids of the gas turbine. A bypass return line extends from the heat exchanger and includes a first return branch and a second return branch. The first return branch extends to the supply line. The second return branch extends to the connection line. At least one first diverter valve disposed on the bypass return line. The at least one first diverter valve operable to direct the flow of water towards one or both of the supply line and the connection line.

In accordance with yet another embodiment of the present disclosure, combined cycle power plant (CCPP) is provided. The CCPP includes a gas turbine, a at least one steam turbine, and a heat recovery steam generator (HRSG) thermally coupling the gas turbine and the at least one steam turbine. The gas turbine having an inlet section, a compressor section, a combustion section, a turbine section, and an exhaust section. The exhaust section configured to receive a flow of exhaust gases from the turbine section. The HRSG includes low pressure economizer disposed within the exhaust section. The HRSG further includes a low pressure evaporator disposed within the exhaust section upstream of the low pressure economizer with respect to the flow of exhaust gases. A water circuit in thermal communication with the gas turbine at least partially via the low pressure economizer and the low pressure evaporator. The water circuit includes a supply line fluidly coupling the low pressure economizer to a low pressure water supply. The water circuit receives a flow of water from the low pressure water supply via the supply line. A connection line fluidly couples the low pressure evaporator to the low pressure economizer. A bypass supply line extends between the connection line and a heat exchanger. The heat exchanger is positioned in thermal communication with one or more fluids of the gas turbine. A bypass return line extends from the heat exchanger and includes a first return branch and a second return branch. The first return branch extends to the supply line. The second return branch extends to the connection line. At least one first diverter valve disposed on the bypass return line. The at least one first diverter valve operable to direct the flow of water towards one or both of the supply line and the connection line.

These and other features, aspects and advantages of the present gas turbine systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present gas turbine systems and methods, including the best mode of making and using the present systems and methods, directed to one of ordinary skill in the art, is set forth in the specification, which makes reference to the appended figures, in which.

DETAILED DESCRIPTION

Figure 1:
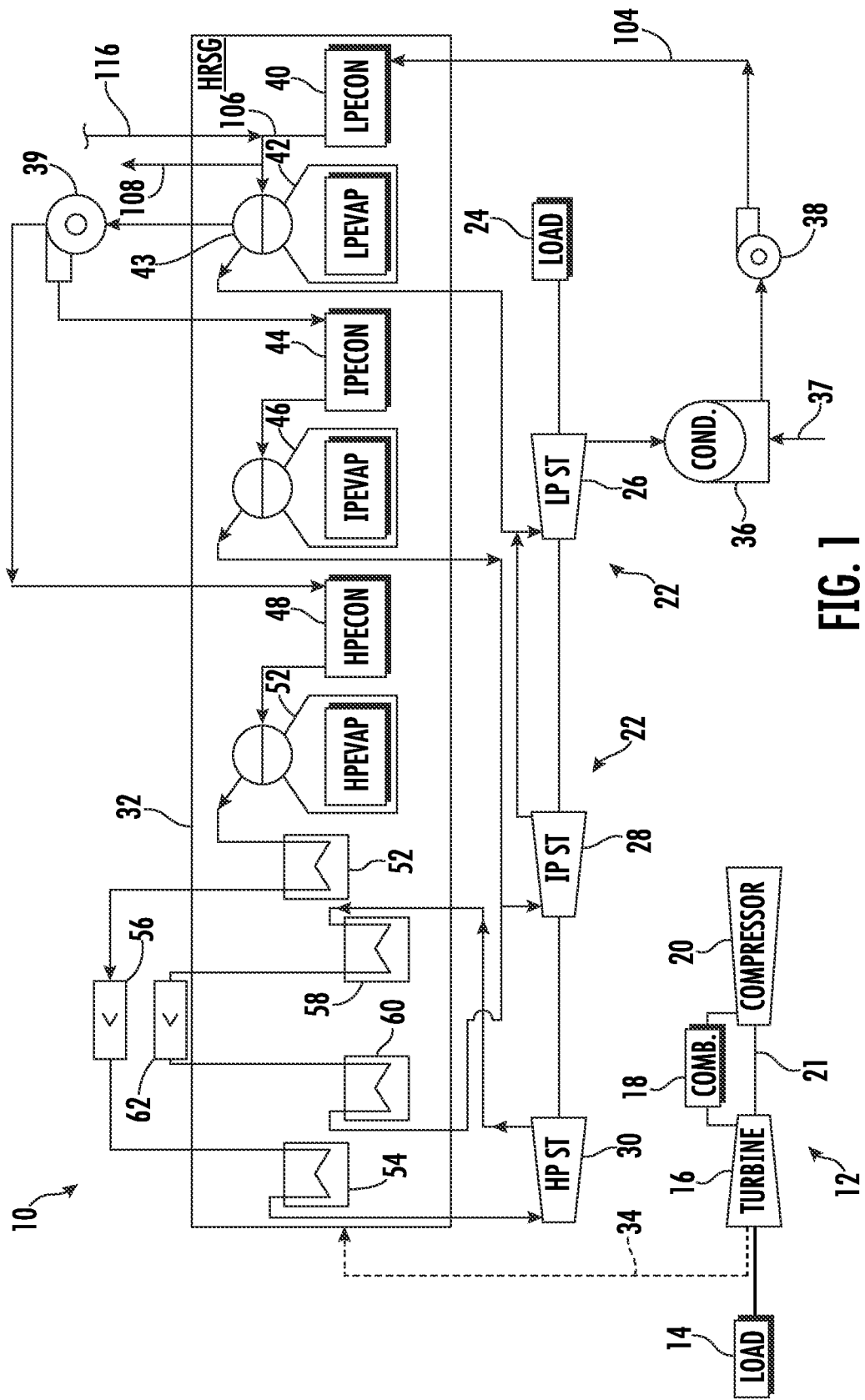
FIG. 1 is a schematic illustration of a combined cycle power plant (CCPP), in accordance with embodiments of the present disclosure.

Reference now will be made in detail to embodiments of the present gas turbine systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "line" may refer to a hose, piping, or tube that is used for carrying fluid(s). The term "fluid" may be a gas or a liquid. The term "fluid communication" means that a fluid is capable of making the connection between the areas specified.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

FIG. 1 is a schematic flow diagram of an embodiment of a combined cycle power generation system or combined cycle power plant (CCPP) 10. The CCPP 10 may include a gas turbine 12 for driving a first load 14. The first load 14 may, for instance, be a generator 15 for producing electrical power (shown in FIGS. 2-5). The gas turbine 12 may include a turbine section 16, a combustion section 18, and a compressor section 20. The turbine section 16 and the compressor section may be connected by one or more shafts 21.

During operation, a working fluid such as air flows into the compressor section 20 where the air is progressively compressed, thus providing compressed air to the combustion section 18. The compressed is mixed with fuel and burned within each combustor to produce combustion gases. The combustion gases flow through the hot gas path from the combustion section 18 into the turbine section 16, wherein energy (kinetic and/or thermal) is transferred from the combustion gases to the rotor blades, causing the one or more shafts 21 to rotate. The mechanical rotational energy may then be used to power the compressor section 20 and/or to generate electricity. Heated exhaust gases 34 exiting the turbine section 16 may then be exhausted from the gas turbine 12 via an exhaust section.

The CCPP 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The CCPP 10 may also include a multi-stage HRSG or HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gases 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) via an LP drum 43 or towards a pump 39. The pump 39 may be operable to direct condensate from the LPEVAP 42 towards either or both of an intermediate pressure economizer 44 (IPECON) or a high-pressure economizer 48 (HPECON) at different pressures. Steam from the low-pressure evaporator 42 may be returned to the low-pressure section 26 of the steam turbine 22. Likewise, from the intermediate-pressure economizer 44, the condensate may be directed into an intermediate-pressure evaporator 46 (IPEVAP). In addition, water and/or steam from the intermediate-pressure economizer 44 may be sent to a one or more fuel heat exchangers where the steam may be used to heat fuel gas for use in the combustion section 18 of the gas turbine 12. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as CCPP 10, hot exhaust may flow from the gas turbine 12 and pass through the HRSG 32 and may be used to generate high-pressure, high-temperature steam, as well as high-temperature water. The steam produced by the HRSG 32 may then be passed through the steam turbine 22 for power generation. In addition, the produced steam may also be supplied to any other processes where superheated steam may be used.

The gas turbine 12 generation cycle is often referred to as the "topping cycle," whereas the steam turbine 22 generation cycle is often referred to as the "bottoming cycle." By combining these two cycles as illustrated in FIG. 1, the combined cycle power plant 10 may lead to greater efficiencies in both cycles. In particular, exhaust heat from the topping cycle may be captured and used to generate steam for use in the bottoming cycle.

The CCPP 10 advantageously recaptures heat from the heated exhaust gases 34 by using the HRSG 32. As illustrated in FIG. 1, components of the gas turbine 12 and the HRSG 32 may be separated into discrete functional units. In other words, the gas turbine 12 may generate the heated exhaust gases 34 and direct the heated exhaust gases 34 toward the HRSG 32, which may be primarily responsible for recapturing the heat from the heated exhaust gases 34 by generating superheated steam. In turn, the superheated steam may be used by the steam turbine 22 as a source of power. The heated exhaust gases 34 may be transferred to the HRSG 32 through a series of ductwork, which may vary based on the particular design of the CCPP 10.

Figure 2:
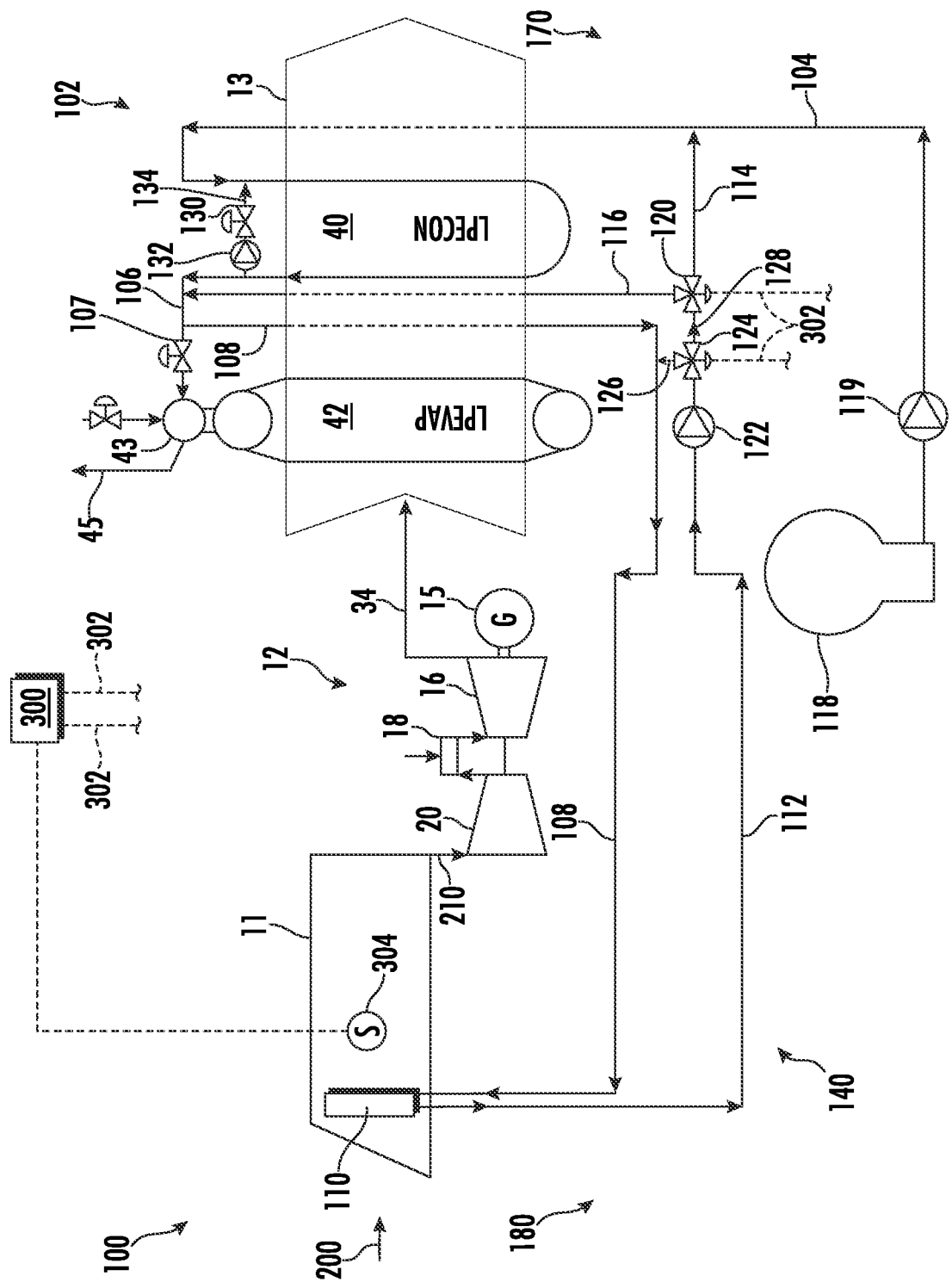
FIG. 2 illustrates a schematic view of a gas turbine system, in accordance with embodiments of the present disclosure.
Figure 3:
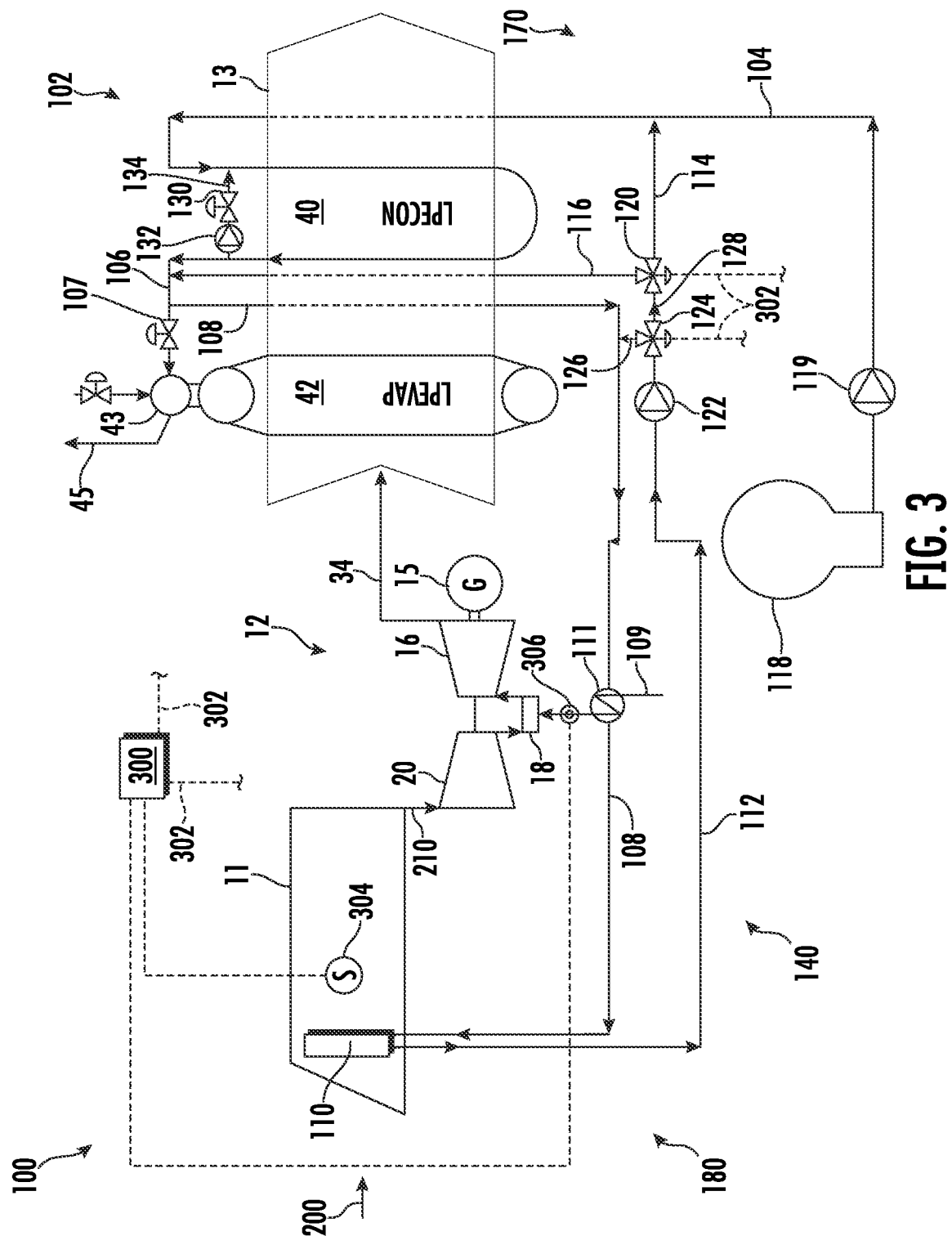
FIG. 3 illustrates a schematic view of a gas turbine system, in accordance with embodiments of the present disclosure.
Figure 4:
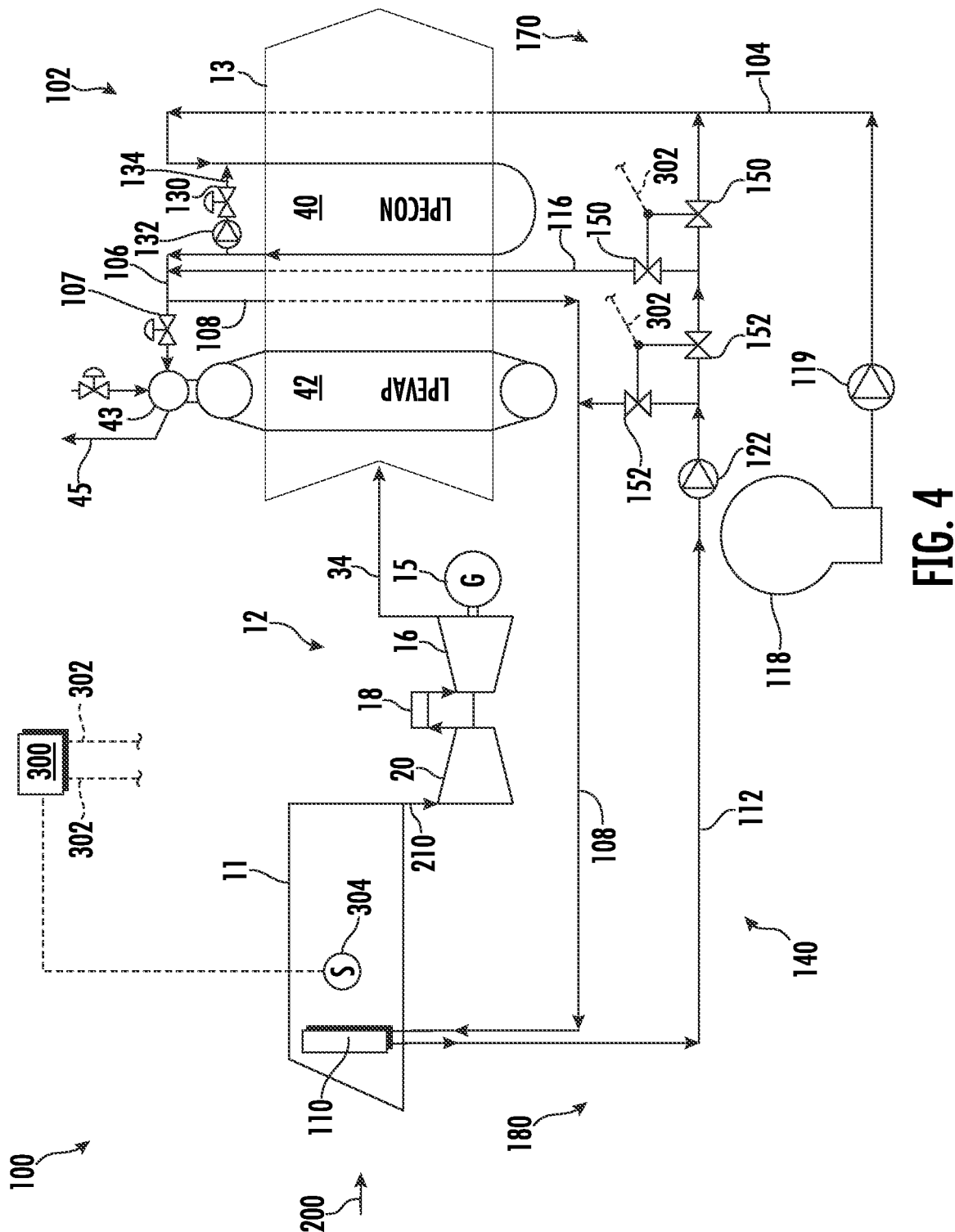
FIG. 4 illustrates a schematic view of a gas turbine system, in accordance with embodiments of the present disclosure.

FIGS. 2-4 each illustrate a schematic view of a gas turbine system 100, which may be a standalone system, or which may be incorporated into the CCPP 10 described above, in accordance with embodiments of the present disclosure. As shown, the gas turbine system 100 includes a gas turbine 12. The gas turbine 12 may include, in a serial flow order, an inlet section 11, a compressor section 20, a combustion section 18, a turbine section 16, an exhaust section 13. In many embodiments, the exhaust section 13 may be an exhaust duct and/or exhaust stack that receives exhaust gases 34 from the turbine section and expels the exhaust gases (e.g. to the atmosphere).

During operation of the gas turbine 12, a working fluid such as air 200 flows through the inlet section 11 and into the compressor section 20 where the air 200 is progressively compressed, thus providing pressurized air to the combustors of the combustion section 18. The pressurized air is mixed with fuel and burned within each combustor to produce combustion gases. The combustion gases flow through the hot gas path from the combustion section 18 into the turbine section 16, in which energy (kinetic and/or thermal) is transferred from the combustion gases to rotor blades, causing a shaft to rotate. The mechanical rotational energy may then be used to power the compressor section 20 and/or to generate electricity (e.g. using a generator 15). The combustion gases exiting the turbine section 16 may then be exhaust gases 34 that are exhausted from the gas turbine 12 via the exhaust section 13.

In exemplary embodiments, the gas turbine system 100 may include a low pressure economizer (LPECON) 40 that is disposed at least partially within the exhaust section 13, such that the LPECON 40 is directly exposed to the exhaust gases 34. The LPECON 40 may also be referred to throughout the present disclosure as a "feedwater preheater" or "feedwater heater." The gas turbine system 100 may further include a low pressure evaporator (LPEVAP) 42 that is disposed at least partially within the exhaust section 13 upstream of the low pressure economizer 40 with respect to the flow of combustion gases 34 through the exhaust section 13. Both the LPECON 40 and the LPEVAP 42 may function at least partially as heat exchangers, such that they provide for thermal communication between the exhaust gases 34 and a a working fluid (such as water, CO2, Freon, or other suitable working fluids) through the LPECON 40 and the LPEVAP 42. For example, lower-temperature water flows into the LPECON 40 from the low pressure water supply 118, which increases the temperature of the water, thereby generating higher-temperature water. The higher-temperature water then flows into the LPEVAP 42 via an LP drum 43. Heat from the exhaust gases is transferred to the higher-temperature feed water, thereby generating LP steam 45 (which may be utilized in a LP steam turbine as shown in FIG. 1).

The gas turbine system 100 may further include a water circuit 102, to which both the LPECON 40 and the LPEVAP 42 may be fluidly connected. In exemplary embodiments, the water circuit 102 may be in thermal communication with the gas turbine 12 at least partially via the LPECON 40 and the LPEVAP 42. As shown in FIG. 2, the water circuit 102 may further include a supply line 104, a connection line 106, a bypass supply line 108, a heat exchanger 110, a bypass return line 112, a first return branch 114 of the bypass return line 112, and a second return branch 116 of the bypass return line 112, a bridge line 126 of the bypass return line 112, and a connecting portion 128 of the bypass return line.

The LPECON 40 may include an economizer valve 130 and an economizer pump 132 each disposed in fluid communication on a recirculating line 134. The recirculating line 134 may extend from immediately downstream of the LPECON 40 to immediately upstream of the LPECON 40. Thus, when the economizer valve 130 is open and the economizer pump 130 is running, at least a portion of the water within the water circuit 102 may be recirculated through the LPECON 40 until it reaches a desired temperature. Alternatively, the economizer valve 130 may be closed and the economizer pump 132 may be shut off, thereby preventing any water from passing through the recirculating line 134.

The supply line 104 may fluidly couple to the LPECON 40 to a low pressure condenser 118. The low pressure condenser 118 may collect and condense steam from the outlet of one or more steam turbines (such as the low pressure steam turbine 26). In many embodiments, the supply line 104 may extend between the low pressure condenser 118 and the low pressure economizer 40, in order to provide a flow of water to the water circuit 102. The supply line 104 may be entirely external to the exhaust section 13, such that the supply line 104 is not exposed to exhaust gases 34 whatsoever.

In other embodiments, in which the gas turbine system 100 is incorporated into a CCPP (such as the CCPP 10 of FIG. 1), the low pressure condenser 118 may be a steam condenser (such as the steam condenser 36) that is fluidly coupled to the outlet of a low pressure steam turbine. Likewise, the supply pump 119 may be a condensate pump (such as the condensate pump 38). In such embodiments, the steam condenser 36 may receive a flow of steam from the outlet of the low pressure steam turbine 26 and may remove heat from the steam, in order to produce a flow of liquid water that is supplied to the water circuit 102 via the supply line 104.

The connection line 106 may fluidly extend between the low pressure economizer 40 and the low pressure evaporator 42, such that the connection line fluidly couples the LPECON 40 to the LPEVAP 42. Particularly, the connection line 106 may extend between the low pressure economizer 40 and the LP drum 43 of the LPEVAP 42. In various embodiments, the bypass supply line 108 may extend between the connection line 106 and the heat exchanger 110. In some embodiments, the bypass supply line 108 may be entirely external to the exhaust section 13, such that the bypass supply line 108 is not exposed to exhaust gases 34 whatsoever. In operation, the bypass supply line 108 may direct a portion of the water (or other coolant fluid) from the connection line 106 towards the heat exchanger 110. In various implementations, the water between the LPECON 40 and the LPEVAP 42 (i.e. the water within the connection line 106), may advantageously be in a liquid state (below the saturation point of the water) and may be at a temperature suitable for use within the heat exchanger 110.

In many embodiments, the gas turbine system 100 may further include a drum level control valve 107 disposed on the connection line 106. The drum level control valve 107 may function to maintain the water level within the LP drum 43.

The bypass supply line 108 of the water circuit 102 may extend between the connection line 106 and the heat exchanger 110 and may be in fluid communication with both the connection line 106 and the heat exchanger 110. For example, the bypass supply line 108 may extend directly from the connection line (upstream from the drum level control valve 107) to the heat exchanger 110. In this way, the bypass supply line 108 may be operable to provide a flow of water, which has been heated by the LPECON 40 (but is below the saturation temperature), to the heat exchanger 110.

In various embodiments, the bypass return line 112 may extend between, and be in fluid communication with, the heat exchanger 110, the connection line 106, the supply line 104, and the bypass supply line 108. For example, the bypass return line 112 may extend from the heat exchanger 110 and may include a first return branch 114, second return branch 116, a bridge line 126, and a connecting portion 128. The first return branch 114 of the bypass return line 112 may extend to the supply line 104, the second return branch 116 of the bypass return line 112 may extend to the connection line 106, the bridge line 126 may extend to the bypass supply line 108, and the connecting portion 128 may extend between the diverter valves 120, 124.

In many embodiments, at least one first diverter valve 120, at least one second diverter valve 124, and a control loop pump 122 may be disposed along the bypass return line 112 and may each be in fluid communication with the bypass return line 112. For example, the control loop pump 122 may be mounted in fluid communication on the bypass return line 112 upstream of both the first diverter valve 120 and the second diverter valve 124. As discussed in more detail below, the at least one first diverter valve 120 may be operable to direct the flow of water towards one or both of the supply line 104 (via the first return branch 114) and/or the connection line 106 (via the second return branch 116). The at least one second diverter valve 124 may be operable to direct the flow of water towards one or both of the bypass supply line 108 (via the bridge line 126) and/or the at least one first diverter valve 120 (via the connecting portion 128).

In exemplary embodiments, such as those shown in FIGS. 2 and 3, the at least one first diverter valve 120 may be a first multipath diverter valve (such as a first three-way valve) and the at least one second diverter valve 124 may be a second multipath diverter valve (such as a second three way valve). In such embodiments, the connecting portion 128 of the bypass return line 112 may extend directly between the second diverter valve 124 and the first diverter valve 120.

As shown in FIGS. 2 and 3, the first return branch 114 of the bypass return line 112 may extend directly from the first diverter valve 120 to the connection line 106. Specifically, the first return branch 114 may be fluidly coupled to the connection line 106 upstream of the LPEVAP 42, the drum level control valve 107, and the bypass supply line 108 but downstream of the LPECON 40. Separately, the second return branch 116 may extend directly from the first diverter valve 120 to the supply line 104. Specifically, the second return branch 116 may be fluidly coupled to the supply line 104 downstream from the water supply and upstream from the LPECON 40. In this way, the first diverter valve 120 may selectively route water either upstream or downstream of the LPECON 40 via the separately extending branches 114, 116. Advantageously, the first diverter valve 120 and the branches 114, 116 provides a means for selectively returning water that has been utilized by a heat exchanger 110 either upstream and/or downstream of the LPECON 40 without requiring large amounts of piping.

In many embodiments, the first diverter valve 120 may be disposed along the bypass return line 112 at the location which the bypass return line splits into branches 114, 116, such that the first diverter valve 120 forms the fluid junction between the connecting portion 128, the first branch 114, and the second branch 116. For example, the branches 114, 116 of the bypass return line 112 may each extend directly from the first diverter valve 120. For instance, the first return branch 114 of the bypass return line 112 may extend between the first diverter valve 120 and the supply line 104 to selectively supply or direct water upstream of the LPECON 40. Separately, the second return branch 116 may extend between the first diverter valve 120 and the connection line 106 to selectively supply or direct water downstream of the LPECON 40. In some embodiments, the second return branch 116 may be entirely external to the exhaust section 13, such that the second return branch 116 is not exposed to exhaust gases 34 whatsoever.

Similarly, the second diverter valve 124 may be disposed along the bypass return line 112 at the location which the bypass return line 112 splits into the bridge line 126 and the connecting portion 128. In this way, the second diverter valve 124 may form the fluid junction between the connecting portion 128 and the bridge line 126. For example, the bridge line 126 and the connecting portion 128 of the bypass return line 112 may each extend directly from the second diverter valve 124. For instance, the bridge line 126 may extend between the second diverter valve 124 and the bypass supply line 108 to selectively supply or direct water back into the bypass supply line 108. Separately, the connecting portion 128 of the bypass return line 112 may extend between the second diverter valve 124 and the first diverter valve 120 to selectively supply or direct water towards the first diverter valve 120.

Operation water circuit 102 may be generally controlled by a processing device or controller 300. The controller 300 can operate various components of water circuit 102, in order to meet the desired heat transfer loads of the one or more heat exchangers disposed on the water circuit 102. In exemplary embodiments, the controller 300 is operably coupled (e.g., in electrical or wireless communication) with each of the valves, e.g., the at least one first diverter valve 120 and the at least one second diverter valve 124. Thus, the controller 300 can selectively actuate and operate the valves based on signals 302 from the controller 300. For example, each of the valves may be selectively actuated by the controller 300 between an open position and a closed position. In particular, one of the valves may be selectively opened to allow for flow of fluid through the respective line or piping to which it is attached. Similarly, each of the pumps 122 and 132 may be selectively operated by the controller 300. For example, the controller 300 may be operable to selectively enable and disable the pumps 122 and 132, thereby controlling the transfer of fluids within the system 100.

The first diverter valve 120 may be actuatable (e.g. by controller 300) between a first position and a second position. The first position of the first diverter valve 120 may convey or direct all of the flow of water from the connecting portion 128 of the bypass return line 112 towards the first return branch 114. The second position of the first diverter valve 120 may convey or direct all of the flow of water from the connecting portion 128 of the bypass return line 112 towards the second return branch 116. Similarly, the second diverter valve 124 may be actuatable between a first position and a second position. The first position of the second diverter valve 124 may convey or direct all of the flow of water from the bypass return line 112 towards the bypass supply line 108. The second position of the second diverter valve 124 may convey or direct all of the flow of water from the bypass return line 112 towards the at least one first diverter valve 121. Additionally, the first diverter valve 120 may be operable to direct the water into both branches 114, 116 in varying amounts. For example, the first diverter valve 120 may be operable to simultaneously direct water into the first return branch 114 and into the second return branch 116. In particular, the water may be split between the branches 114, 116 by the first diverter valve 120, in percentages, 50/50, such as 40/60, such as 30/70, such as 20/80, such as 10/90, or any other ratio of percentages. Additionally, the first diverter valve 120 may be operable to direct all of the water into one of the branches 114, 116, such that 100% of the water enters one of the branches 114, 116 and 0% of the water enters the other of the branches 114, 116.

Likewise, the second diverter valve 124 may be operable to direct the water into both the bridge line 126 and the connecting portion 128 in varying amounts. For example, the second diverter valve 124 may be operable to simultaneously direct water into the bridge line 126 and into the connecting portion 128. In particular, the water may be split between the connecting portion 128 and the bridge line 126 by the second diverter valve 124, in percentages, 50/50, such as 40/60, such as 30/70, such as 20/80, such as 10/90, or any other ratio of percentages. Additionally, the second diverter valve 124 may be operable to direct all of the water into one of the connecting portion 128 or the bridge line 126.

In many embodiments, as shown, the heat exchanger 110 may be a heating coil disposed within the inlet section 11 of the gas turbine. The heating coil provide for thermal communication between the air 200 entering the inlet section 11 and the flow of water through the heating coil. For example, the heating coil may be configured to receive ambient air and to transfer heat to the air, thereby establishing a heated airflow 210 into the compressor 18. In particular, the heating coil may be configured to provide for thermal communication between a working fluid (e.g., water) and the air 200 received by the inlet section 11.

Alternatively or additionally, as shown in FIG. 3, the gas turbine system 100 may further include a heat exchanger 111 disposed in thermal communication on the bypass supply line 108. The heat exchanger 111 may be a fuel heat exchanger in exemplary embodiments. The fuel heat exchanger may be operable to add heat energy from the water within the bypass supply line 108 to fuel traveling through the fuel line 109 before the fuel enters the combustion section 18 of the gas turbine 12.

One or more sensors 304, 306 may be disposed in close proximity to one or both of the heat exchangers 110, 111. The one or more sensors 304, 306 may be in electrical communication with the controller 300, such that the one or more sensors 304 is operable to communicate sensed data to the controller 300. In particular, the one or more sensors 304 may be a thermocouple (or other suitable temperature measurement sensor) operable to sense temperature data of a gas turbine fluid (such as inlet air) and communicate the temperature data to the controller 300. The sensor 304 may be disposed within the inlet section 11 of the gas turbine 12 and may be operable to sense the temperature of the air. The sensor 306 (FIG. 3) may be disposed within the fuel line 109 and may be operable to sense the temperature of the fuel.

In one or more exemplary implementations of the invention, if it is determined (e.g. via a controller 300 and one or more sensors 304, 306) that additional heat energy is necessary at either of the heat exchangers 110, 111 during operation, then the first diverter valve 120 may selectively route the water upstream of the LPECON 40 via the second return branch 116, such that the water will then gain the additional heat energy by passing through the LPECON 40. Alternatively, if it is determined (e.g. via a controller 300 and one or more sensors 304, 306) that no additional heat energy is necessary at the heat exchangers 110, 111 during operation, then the second diverter valve 124 may selectively route the water from bypass return line 112 back to the bypass supply line 108 via the bridge line 126, thereby preventing any heat source (hot water supply) from the connection line 106 to convey heat to heat exchangers 110 and 111.

In other embodiments, such as the one shown in FIG. 4, instead of multipath diverter valves shown in FIGS. 2 and 3, the at least one first diverter valve 120 may be two first diverter valves 150, which may be mechanically coupled to one another such that they are capable of being actuated together (e.g. with the controller 300) to control the flow of water therethrough. For example, the mechanical, electrical, hydraulic or pneumatic linkage between the two valves 150, 150 ensures that they work together in concert (e.g., while one closing the other opening). Likewise, in other embodiments, as shown in FIG. 4, the at least one second diverter valve 124 may be two second diverter valves 152, which may be mechanically coupled to one another such that they are capable of being actuated together to control the flow of water therethrough. For example, the mechanical, electrical, hydraulic or pneumatic linkage between the two valves 152, 152 ensures that they work together in concert (e.g., while one closing the other opening).

Figure 5:
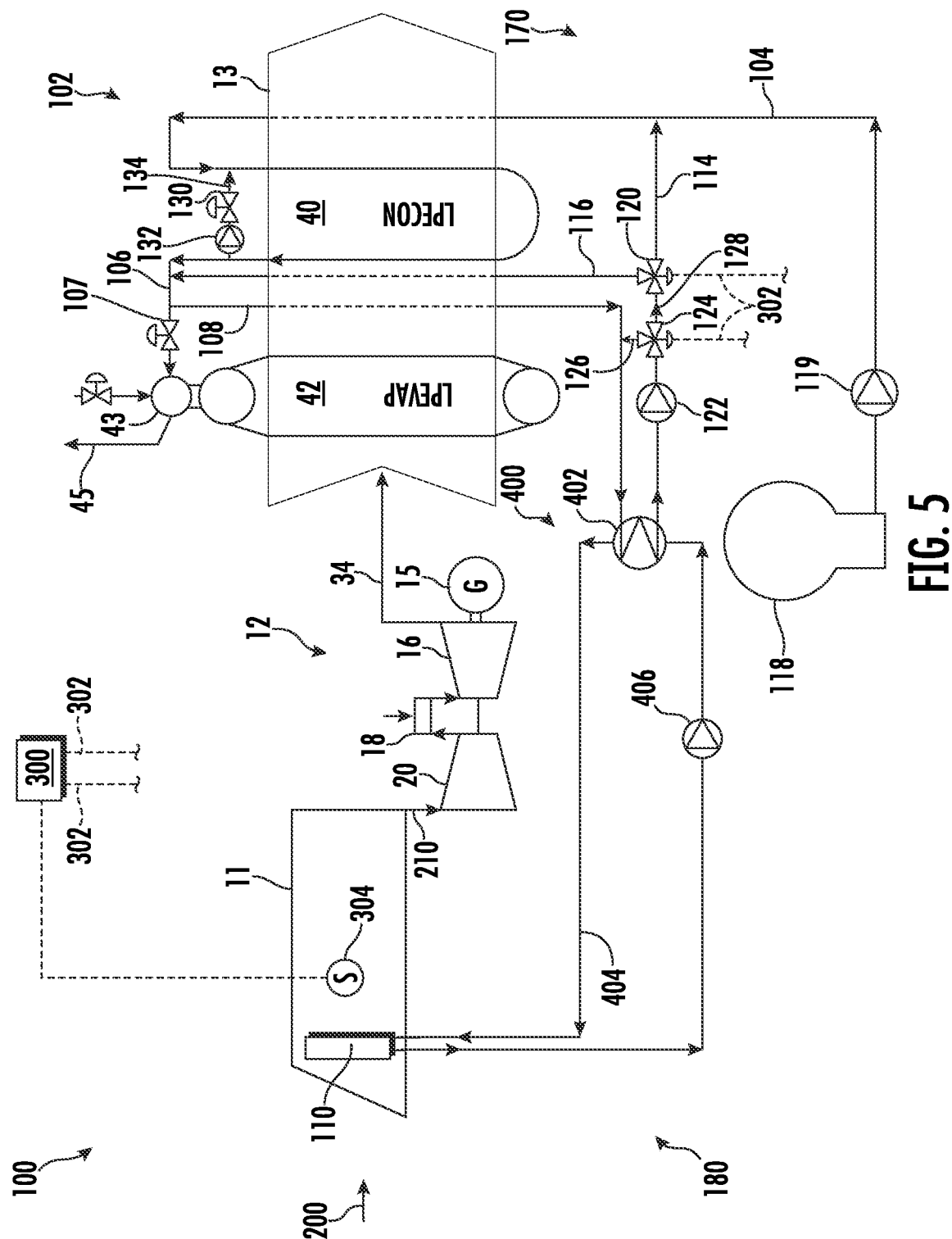
FIG. 5 illustrates a schematic view of a gas turbine system, in accordance with embodiments of the present disclosure.

Additionally or alternatively, in further embodiments, such as the one shown in FIG. 5, the system 100 may include a freeze protection system 400. In such embodiments, the heat exchanger 110 (and/or the heat exchanger 111) may be fluidly isolated from the water circuit 102 but in thermal communication with the water circuit 102 via a heat exchanger 402. For example, the gas turbine system 100 may further include a circuit 402, through which a motive fluid (such as water, CO2, freon, water/glycol, or other suitable motive fluids) may circulate by operating a pump 406. The heat exchanger 402 may provide for thermal communication between the circuit 402 and the water circuit 102, while keeping the circuits 102, 402 fluidly isolated from each other. By operating the gas turbine system 100 in such a manner, the risk of freezing water within the water circuit 102 is advantageously reduced.

The gas turbine system 100 described herein may advantageously define two flow circuits arranged in parallel to one another without utilizing unnecessary piping. For example, the first flow circuit 170 may be defined collectively by the connection line 106, the bypass supply line 108, the heat exchanger 110, a portion of the bypass return line 112 extending between the heat exchanger 110 and the first diverter valve 120, and the first return branch 114 of the bypass return line 112. In this way, the first flow circuit 170 may receive a flow of water from the connection line 106 and may return the flow of water upstream of the LPECON 40.

Similarly, the second flow circuit 180 may be defined collectively by the connection line 106, the bypass supply line 108, the heat exchanger 110, a portion of the bypass return line 112 extending between the heat exchanger 110 and the first diverter valve 120, the second return branch 116 of the bypass return line 112, and the supply line 106. In this way, the second flow circuit 180 may receive a flow of water from the connection line 106 and may return the flow of water downstream of the LPECON 40. Accordingly, the first diverter valve 120 may advantageously return water that has been utilized by one or more heat exchangers either upstream and/or downstream of the LPECON 40 via the branches 114, 116 depending on system requirements. Fore example, if the gas turbine system 100 requires more heat at the one or more heat exchangers, then the first diverter valve 120 may direct a larger portion of water upstream of the LPECON 40 (in order to add heat energy). Conversely, if the gas turbine system 100 requires less heat at the one or more heat exchangers, then the first diverter valve 120 may direct a larger portion of water downstream of the LPECON 40.

In exemplary implementations, the system 100 may enter a "0% heating duty" mode. In such implementations, the second diverter valve 124 may be fully closed to the connecting portion 128 and fully open to the bridge line 126, which may create a flow loop 140 (e.g., by operating the pump 122). The flow loop 140 may be defined collectively by the bypass supply line 108, the heat exchanger 110, the bypass return line 112, and the bridge line 126. By operating the second diverter valve 124 in such a way, the flow loop 140 may be thermally isolated from the heat source (e.g., the LPECON 40), and the temperature of the working fluid (e.g., the water) within the flow loop 140 may quickly equalize with the temperature of the air 200.

In further exemplary implementations, the system 100 may enter a "100% heating duty" mode. In such implementations, the second diverter valve 124 may be fully open to the connecting portion 128 and fully closed to the bridge line 126. By operating the second diverter valve 124 in such a way, the maximum amount of flow may recirculate through the heat source (e.g., the LPECON 40), thereby providing the maximum amount of heat to the heat exchanger(s) 110, 111.

It should be appreciated that the diverter valves 120, 124 provide the system 100 with increased operational flexibility (e.g., full operational flexibility between 0% heating duty and 100% heating duty) by actuating the diverter valves 120, 124 according to operational requirements.

Figure 6:
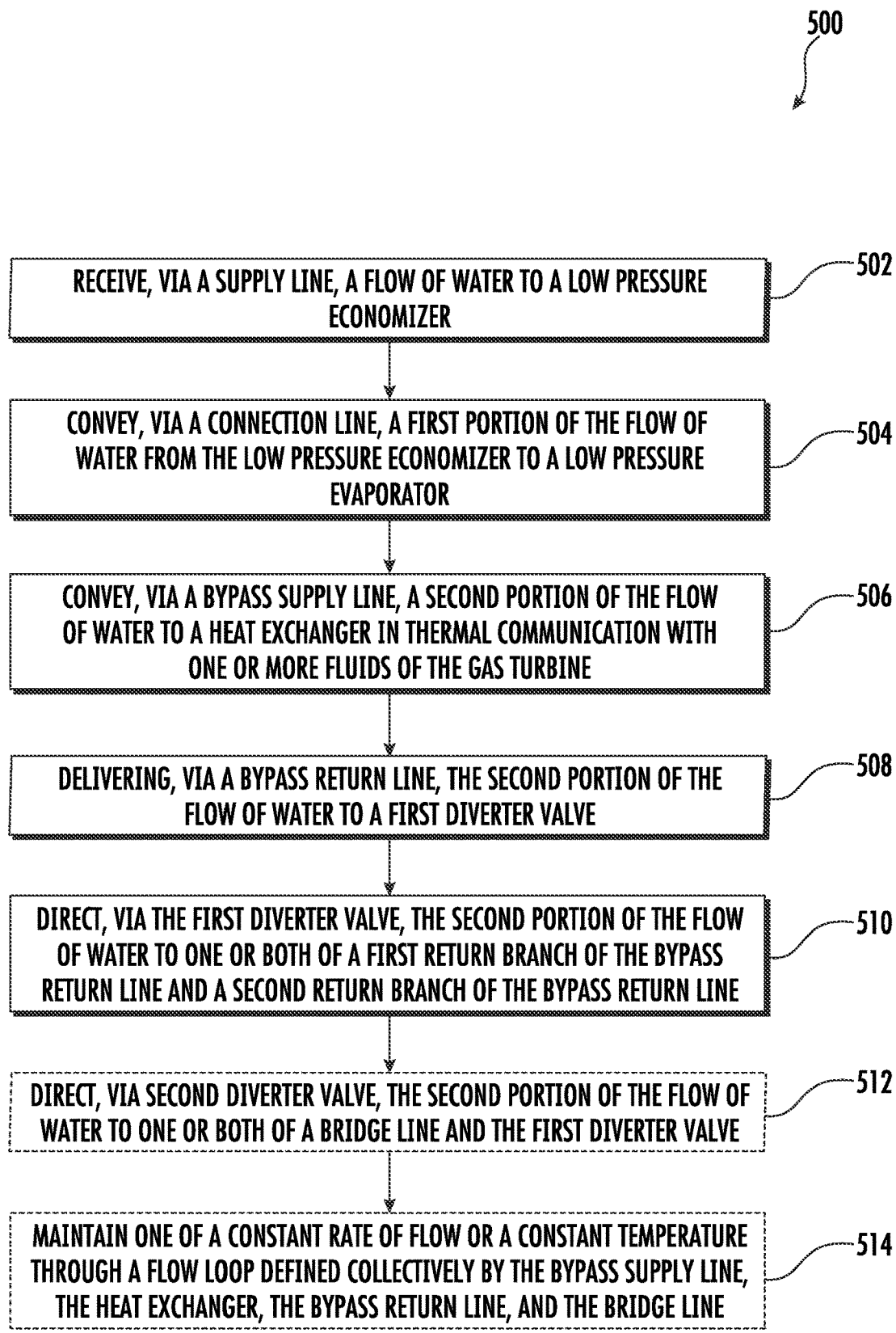
FIG. 6 illustrates a flow diagram of a method of operating a gas turbine system, in accordance with embodiments of the present disclosure.

Referring now to FIG. 6, a flow diagram of a method 500 of operating a gas turbine system (such as the gas turbine system 100 described hereinabove), in which the dashed boxes indicate optional steps of the method 500. the gas turbine system 100 including a gas turbine 12 and a water circuit 102 in thermal communication with the gas turbine 12. the gas turbine 12 having an inlet section 11, a compressor section 20, a combustion section 18, a turbine section 16, and an exhaust section 13. the exhaust section 13 may be configured to receive a flow of exhaust gases 34 from the turbine section 16.

As shown, the method 500 may include an initial step 502 of receiving, via a supply line 104, a flow of water to a low pressure economizer 40. the low pressure economizer 40 may be disposed at least partially within an exhaust section 13 of the gas turbine system 100. In this way, the low pressure economizer 40 may function as a heat exchanger, which provides for thermal communication between the exhaust gases 34 and the flow of water.

The method 500 may further include a step 504 of conveying, via a connection line 106, a first portion of the flow of water from the low pressure economizer 40 to a low pressure evaporator 42. the low pressure evaporator 42 may be disposed at least partially within the exhaust section 13 upstream of the low pressure economizer 40 with respect to the flow of exhaust gases 34. The low pressure evaporator 42 may receive the flow of high-temperature water that exits the low pressure economizer 40 via the LP drum 43 and may generate low pressure steam 45 from the high-temperature water. The low pressure steam 45 may be utilized in one or more steam turbines (as shown in FIG. 1).

The method 500 may further include a step 506 of conveying, via a bypass supply line 108, a second portion of the flow of water to a heat exchanger 110, 111 in thermal communication with one or more fluids of the gas turbine 12. For example, the heat exchanger 110, 111 may be one of a heating coil disposed in the inlet section 11 of the gas turbine 12 and/or a fuel heat exchanger disposed on the bypass supply line. If the heat exchanger is a heating coil, then the heat exchanger may provide for thermal communication between the water within the bypass supply line and the air entering the inlet section 11 of the gas turbine 12. If the heat exchanger is a fuel heat exchanger, then the heat exchanger may provide for thermal communication between the water within the bypass supply line and fuel prior to entrance into the combustion section 18. Alternatively or additionally, the gas turbine system 100 may include both a heating coil and a fuel heat exchanger.

The method 500 may further include a step 508 of delivering, via a bypass return line 112, the second portion of the flow of water to a first diverter valve 120. In some embodiments, the first diverter valve 120 may be a first diverter valve 120 (FIGS. 2 and 3). In other embodiments, the first diverter valve 120 may be two first diverter valves 150 (FIG. 4) mechanically coupled to one another such that they may be actuated together (e.g. by a controller 300).

The method 500 may further include a step 510 of directing, via the first diverter valve 120, the second portion of the flow of water to one or both of a first a first return branch 114 of the bypass return line 112 and a second return branch 116 of the bypass return line 112. The first return branch 114 may extend between the first diverter valve 120 and the supply line 104. The second return branch 116 may extend between the first diverter valve 120 and the connection line 106.

In optional embodiments, the method 500 may further include an optional step 512 of directing, via at least one second diverter valve 124, the second portion of the flow of water to one or both of a bridge line 126 and the at least one first diverter valve 120. the bridge line may extend between the at least one second diverter valve 124 and the bypass supply line 108. In some embodiments, the second diverter valve 124 may be a second diverter valve 124 (FIGS. 2 and 3). In other embodiments, the second diverter valve 124 may be two second diverter valves 152 (FIG. 4) mechanically coupled to one another such that they may be actuated together (e.g. by a controller 300).

In some embodiments, the method 500 may further include an optional step 514 of maintaining one of a constant rate of flow or a constant temperature through a flow loop 140 defined collectively by the bypass supply line 108, the heat exchanger 110, the bypass return line 112, and the bridge line 126. If a constant flow rate is maintained, then the control loop pump 122 may be set to a constant speed, and the temperature of the water within the flow loop 140 may be varied by actuating the diverter valves 120, 124. Alternatively, if a constant temperature is maintained, then the flow rate may be varied within the flow loop 140 by varying the speed of the control loop pump 122.

In some embodiments, the method may include sensing data, via one or more sensors 304, 306, indicative of a temperature of the one or more fluids of the gas turbine. For example, the sensors 304, 306 may be configured to measure a temperature of the fluid that is having heat transferred thereto. Specifically, the sensor 304 disposed in the inlet section 11 may be configured to measure the temperature of the air, and the sensor 304 disposed on the fuel line 109 may be configured to measure the temperature of the fuel. In this way, the sensors 304, 306 may communicate the data to the controller 300, which may determine if heat needs to be added to either of the fluids, and the controller 300 may actuate the diverter valves 120, 124 accordingly.

For example, the method may also include determining, based at least partially on the sensed data from the sensors 304, 306, that a temperature of the one or more fluids of the gas turbine 12 is outside of a predetermined range. For example, the temperature of the air within the inlet section is too cold/hot or the temperature of the fuel is too cold/hot. In response, the controller 300 may actuate the first diverter valve 120 and the second diverter valve to modify a water temperature of the second portion of water in response to determining that the temperature of the one or more fluids of the gas turbine is outside of the predetermined range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a gas turbine system, the gas turbine system including a gas turbine and a water circuit in thermal communication with the gas turbine, the gas turbine having an inlet section, a compressor section, a combustion section, a turbine section, and an exhaust section, the exhaust section configured to receive a flow of exhaust gases from the turbine section, the method comprising: receiving, via a supply line, a flow of water to a low pressure economizer, the low pressure economizer disposed at least partially within the exhaust section of the gas turbine system; conveying, via a connection line, a first portion of the flow of water from the low pressure economizer to a low pressure evaporator, the low pressure evaporator disposed at least partially within the exhaust section upstream of the low pressure economizer with respect to the flow of exhaust gases; conveying, via a bypass supply line, a second portion of the flow of water to a heat exchanger in thermal communication with one or more fluids of the gas turbine; delivering, via a bypass return line, the second portion of the flow of water to at least one first diverter valve; and directing, via the at least one first diverter valve, the second portion of the flow of water to one or both of a first return branch of the bypass return line and a second return branch of the bypass return line, the first return branch extending between the at least one first diverter valve and the supply line, the second return branch extending between the at least one first diverter valve and the connection line.

The method of one or more of these clauses, further comprising directing, via at least one second diverter valve, the second portion of the flow of water to one or both of a bridge line and the at least one first diverter valve, the bridge line extending between the second diverter valve and the bypass supply line.

The method of one or more of these clauses, further comprising maintaining one of a constant rate of flow or a constant temperature through a flow loop defined collectively by the bypass supply line, the heat exchanger, the bypass return line, and the bridge line.

The method of one or more of these clauses, further comprising sensing, via one or more sensors, data indicative of a temperature of the one or more fluids of the gas turbine.

The method of one or more of these clauses, further comprising determining, based at least partially on the sensed data, that the temperature of the one or more fluids of the gas turbine is outside of a predetermined range.

The method of one or more of these clauses, further comprising actuating the at least one first diverter valve and the at least one second diverter valve to modify a water temperature of the second portion of the flow of water in response to determining that the temperature of the one or more fluids of the gas turbine is outside of the predetermined range.

The method of one or more of these clauses, wherein the directing step further comprises dividing, via the at least one first diverter valve, the second portion of the flow of water into a first return flow and a second return flow; delivering the first return flow, via the first return branch, to the supply line; and delivering the second return flow, via the second return branch, to the connection line.

The method of one or more of these clauses, wherein the at least one first diverter valve is a multipath diverter valve, and wherein the method further comprises actuating the multipath diverter valve between a first position and a second position, wherein the first position of the multipath diverter valve conveys all of the second portion of the flow of water from the bypass return line to the first return branch, and wherein the second position of the multipath diverter valve conveys all of the second portion of the flow of water from the bypass return line to the second return branch.

The method of one or more of these clauses, wherein the at least one first diverter valve is two first diverter valves mechanically coupled to one another such that the two first diverter valves are actuated together.

A gas turbine system comprising a gas turbine having an inlet section, a compressor section, a combustion section, a turbine section, and an exhaust section, the exhaust section configured to receive a flow of exhaust gases from the turbine section; a low pressure economizer disposed at least partially within the exhaust section; a low pressure evaporator disposed at least partially within the exhaust section upstream of the low pressure economizer with respect to the flow of exhaust gases; and a water circuit in thermal communication with the gas turbine at least partially via the low pressure economizer and the low pressure evaporator, the water circuit comprising a supply line fluidly coupling the low pressure economizer to a low pressure water supply, wherein the water circuit receives a flow of water from the low pressure water supply via the supply line; a connection line fluidly coupling the low pressure evaporator to the low pressure economizer; a bypass supply line extending between the connection line and a heat exchanger, the heat exchanger in thermal communication with one or more fluids of the gas turbine; a bypass return line extending from the heat exchanger and including a first return branch and a second return branch, the first return branch extending to the supply line, the second return branch extending to the connection line; and at least one first diverter valve disposed on the bypass return line, the at least one first diverter valve operable to direct the flow of water towards one or both of the supply line and the connection line.

The gas turbine system of one or more of these clauses, wherein the at least one first diverter valve is a first multipath diverter valve actuatable between a first position and a second position, wherein the first position of the first multipath diverter valve conveys all of the flow of water from the bypass return line to the first return branch, and wherein the second position of the first multipath diverter valve conveys all of the flow of water from the bypass return line to the second return branch.

The gas turbine system of one or more of these clauses, wherein the heat exchanger is one of a heating coil disposed in the inlet section and a fuel heat exchanger.

The gas turbine system of one or more of these clauses, wherein the heat exchanger is a heating coil disposed in the inlet section of the gas turbine, and wherein the gas turbine system further comprises a fuel heat exchanger disposed on the bypass supply line.

The gas turbine system of one or more of these clauses, further comprising at least one second diverter valve disposed on the bypass return line upstream from the at least one first diverter valve relative to the flow of water through the bypass return line.

The gas turbine system of one or more of these clauses, wherein the at least one second diverter valve is a second multipath diverter valve actuatable between a first position and a second position, wherein the first position of the multipath diverter valve conveys all of the flow of water from the bypass return line to the bypass supply line, and wherein the second position of the multipath diverter valve conveys all of the flow of water from the bypass return line to the at least one first diverter valve.

The gas turbine system of one or more of these clauses, wherein the water supply further comprises a steam condenser and a condenser pump, the steam condenser being operable to condense steam from one or more steam sources into water.

The gas turbine system of one or more of these clauses, further comprising a drum level control valve disposed on the connection line.

A combined cycle power plant (CCPP) comprising a gas turbine, at least one steam turbine, and a heat recovery steam generator (HRSG) thermally coupling the gas turbine and the at least one steam turbine, the gas turbine having an inlet section, a compressor section, a combustion section, a turbine section, and an exhaust section, the exhaust section configured to receive a flow of exhaust gases from the turbine section, the HRSG comprising a low pressure economizer disposed within the exhaust section; a low pressure evaporator disposed within the exhaust section upstream of the low pressure economizer with respect to the flow of exhaust gases; and a water circuit in thermal communication with the gas turbine at least partially via the low pressure economizer and the low pressure evaporator, the water circuit comprising a supply line fluidly coupling the low pressure economizer to a low pressure water supply, wherein the water circuit receives a flow of water from the low pressure water supply via the supply line; a connection line fluidly coupling the low pressure evaporator to the low pressure economizer; a bypass supply line extending between the connection line and a heat exchanger, the heat exchanger in thermal communication with one or more fluids of the gas turbine; a bypass return line extending from the heat exchanger and including a first return branch and a second return branch, the first return branch extending to the supply line, the second return branch extending to the connection line; and at least one first diverter valve disposed on the bypass return line, the at least one first diverter valve operable to direct the flow of water towards one or both of the supply line and the connection line.

The CCPP of one or more of these clauses, wherein the at least one first diverter valve is a first multipath diverter valve actuatable between a first position and a second position, wherein the first position of the first multipath diverter valve conveys all of the flow of water from the bypass return line to the first return branch, and wherein the second position of the first multipath diverter valve conveys all of the flow of water from the bypass return line to the second return branch. The CCPP of one or more of these clauses, wherein the heat exchanger is at least one of a heating coil disposed in the inlet section and a fuel heat exchanger.

What is claimed is:

1. A method of operating a gas turbine system, the gas turbine system including a gas turbine and a water circuit in thermal communication with the gas turbine, the gas turbine having an inlet section, a compressor section, a combustion section, a turbine section, and an exhaust section, the exhaust section configured to receive a flow of exhaust gases from the turbine section, the method comprising:

receiving, via a supply line, a flow of water to a low pressure economizer, the low pressure economizer disposed at least partially within the exhaust section of the gas turbine system;

conveying, via a connection line, a first portion of the flow of water from the low pressure economizer to a low pressure evaporator, the low pressure evaporator disposed at least partially within the exhaust section upstream of the low pressure economizer with respect to the flow of exhaust gases;

conveying, via a bypass supply line, a second portion of the flow of water to a heat exchanger in thermal communication with one or more fluids of the gas turbine;

delivering, via a bypass return line, the second portion of the flow of water to at least one first diverter valve; and directing, via the at least one first diverter valve, the second portion of the flow of water to one or both of a first return branch of the bypass return line and a second return branch of the bypass return line, the first return branch extending between the at least one first diverter valve and the supply line, the second return branch extending between the at least one first diverter valve and the connection line.

2. The method of claim 1, further comprising:
directing, via at least one second diverter valve, the second portion of the flow of water to one or both of a bridge line and the at least one first diverter valve, the bridge line extending between the second diverter valve and the bypass supply line.

3. The method of claim 2, further comprising:
maintaining one of a constant rate of flow or a constant temperature through a flow loop defined collectively by the bypass supply line, the heat exchanger, the bypass return line, and the bridge line.

4. The method of claim 3, further comprising:
sensing, via one or more sensors, data indicative of a temperature of the one or more fluids of the gas turbine.

5. The method of claim 4, further comprising:
determining, based at least partially on the sensed data, that the temperature of the one or more fluids of the gas turbine is outside of a predetermined range.

6. The method of claim 5, further comprising:
actuating the at least one first diverter valve and the at least one second diverter valve to modify a water temperature of the second portion of the flow of water in response to determining that the temperature of the one or more fluids of the gas turbine is outside of the predetermined range.

7. The method of claim 1, wherein the directing step further comprises:
dividing, via the at least one first diverter valve, the second portion of the flow of water into a first return flow and a second return flow;
delivering the first return flow, via the first return branch, to the supply line; and
delivering the second return flow, via the second return branch, to the connection line.

8. The method of claim 1, wherein the at least one first diverter valve is a multipath diverter valve, and wherein the method further comprises actuating the multipath diverter valve between a first position and a second position, wherein the first position of the multipath diverter valve conveys all of the second portion of the flow of water from the bypass return line to the first return branch, and wherein the second position of the multipath diverter valve conveys all of the second portion of the flow of water from the bypass return line to the second return branch.

9. The method of claim 1, wherein the at least one first diverter valve is two first diverter valves mechanically coupled to one another such that the two first diverter valves are actuated together.

10. A gas turbine system comprising:
a gas turbine having an inlet section, a compressor section, a combustion section, a turbine section, and an exhaust section, the exhaust section configured to receive a flow of exhaust gases from the turbine section;
a low pressure economizer disposed at least partially within the exhaust section;
a low pressure evaporator disposed at least partially within the exhaust section upstream of the low pressure economizer with respect to the flow of exhaust gases; and
a water circuit in thermal communication with the gas turbine at least partially via the low pressure economizer and the low pressure evaporator, the water circuit comprising:
a supply line fluidly coupling the low pressure economizer to a low pressure water supply, wherein the water circuit receives a flow of water from the low pressure water supply via the supply line;
a connection line fluidly coupling the low pressure evaporator to the low pressure economizer;
a bypass supply line extending between the connection line and a heat exchanger, the heat exchanger in thermal communication with one or more fluids of the gas turbine;
a bypass return line extending from the heat exchanger and including a first return branch and a second return branch, the first return branch extending to the supply line, the second return branch extending to the connection line; and
at least one first diverter valve disposed on the bypass return line, the at least one first diverter valve operable to direct the flow of water towards one or both of the supply line and the connection line.

11. The gas turbine system of claim 10, wherein the at least one first diverter valve is a first multipath diverter valve actuatable between a first position and a second position, wherein the first position of the first multipath diverter valve conveys all of the flow of water from the bypass return line to the first return branch, and wherein the second position of the first multipath diverter valve conveys all of the flow of water from the bypass return line to the second return branch.

12. The gas turbine system of claim 10, wherein the heat exchanger is one of a heating coil disposed in the inlet section and a fuel heat exchanger.

13. The gas turbine system of claim 10, wherein the heat exchanger is a heating coil disposed in the inlet section of the gas turbine, and wherein the gas turbine system further comprises a fuel heat exchanger disposed on the bypass supply line.

14. The gas turbine system of claim 10, further comprising at least one second diverter valve disposed on the bypass return line upstream from the at least one first diverter valve relative to the flow of water through the bypass return line.

15. The gas turbine system of claim 14, wherein the at least one second diverter valve is a second multipath diverter valve actuatable between a first position and a second position, wherein the first position of the multipath diverter valve conveys all of the flow of water from the bypass return line to the bypass supply line, and wherein the second position of the multipath diverter valve conveys all of the flow of water from the bypass return line to the at least one first diverter valve.

16. The gas turbine system of claim 10, wherein the water supply further comprises a steam condenser and a condenser pump, the steam condenser being operable to condense steam from one or more steam sources into water.

17. The gas turbine system of claim 16, further comprising a drum level control valve disposed on the connection line.

18. A combined cycle power plant (CCPP) comprising:
a gas turbine, at least one steam turbine, and a heat recovery steam generator (HRSG) thermally coupling the gas turbine and the at least one steam turbine, the gas turbine having an inlet section, a compressor section, a combustion section, a turbine section, and an exhaust section, the exhaust section configured to receive a flow of exhaust gases from the turbine section, the HRSG comprising:
a low pressure economizer disposed within the exhaust section;
a low pressure evaporator disposed within the exhaust section upstream of the low pressure economizer with respect to the flow of exhaust gases; and
a water circuit in thermal communication with the gas turbine at least partially via the low pressure economizer and the low pressure evaporator, the water circuit comprising:
a supply line fluidly coupling the low pressure economizer to a low pressure water supply, wherein the water circuit receives a flow of water from the low pressure water supply via the supply line;
a connection line fluidly coupling the low pressure evaporator to the low pressure economizer;
a bypass supply line extending between the connection line and a heat exchanger, the heat exchanger in thermal communication with one or more fluids of the gas turbine;
a bypass return line extending from the heat exchanger and including a first return branch and a second return branch, the first return branch extending to the supply line, the second return branch extending to the connection line; and
at least one first diverter valve disposed on the bypass return line, the at least one first diverter valve operable to direct the flow of water towards one or both of the supply line and the connection line.

19. The CCPP of claim 18, wherein the at least one first diverter valve is a first multipath diverter valve actuatable between a first position and a second position, wherein the first position of the first multipath diverter valve conveys all of the flow of water from the bypass return line to the first return branch, and wherein the second position of the first multipath diverter valve conveys all of the flow of water from the bypass return line to the second return branch.

20. The CCPP of claim 18, wherein the heat exchanger is at least one of a heating coil disposed in the inlet section and a fuel heat exchanger.

* * * * *